(12) United States Patent
Dunbar et al.

(10) Patent No.: US 11,745,186 B2
(45) Date of Patent: Sep. 5, 2023

(54) RETENTION CLIP AND SAMPLE RACK FOR A SAMPLE ANALYSIS SYSTEM

(71) Applicant: Siemens Healthcare Diagnostics Inc., Tarrytown, NY (US)

(72) Inventors: Andrew Dunbar, Boston, MA (US); Michael Chen, Sharon, MA (US); William Perry, Sharon, MA (US); Steven Geehan, Braintree, MA (US); Gyula Hojer, Telki (HU); Norbert Laszka, Budapest (HU)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 272 days.

(21) Appl. No.: 16/609,545

(22) PCT Filed: May 8, 2018

(86) PCT No.: PCT/US2018/031549
§ 371 (c)(1),
(2) Date: Oct. 30, 2019

(87) PCT Pub. No.: WO2018/208748
PCT Pub. Date: Nov. 15, 2018

(65) Prior Publication Data
US 2020/0114364 A1    Apr. 16, 2020

Related U.S. Application Data

(60) Provisional application No. 62/504,113, filed on May 10, 2017.

(51) Int. Cl.
*B01L 9/06* (2006.01)
*B01L 3/00* (2006.01)

(52) U.S. Cl.
CPC .............. *B01L 9/06* (2013.01); *B01L 3/508* (2013.01)

(58) Field of Classification Search
None
See application file for complete search history.

(56) References Cited

U.S. PATENT DOCUMENTS 2,741,913 A    4/1956  Dovas
5,137,693 A    8/1992  Mawhirt
(Continued)

FOREIGN PATENT DOCUMENTS

EP    1935321 A1    6/2008
GB    2481590 A     1/2012

OTHER PUBLICATIONS

International Search Report and Written Opinion of International Application No. PCT/US2018/031549 dated Jul. 27, 2018.
(Continued)

*Primary Examiner* — Paul S Hyun
(74) *Attorney, Agent, or Firm* — Dunlap Codding, P.C.

(57) ABSTRACT

An embodiment is a sample rack system. The sample rack system comprises a rack having a base, a top opposite the base along a vertical direction, a receptacle that extends from the top toward the base along the vertical direction, and a receiver element proximate the top. The receptacle is sized to receive a sample collection unit. The system also includes a retention clip for holding the sample collection unit in the receptacle. The retention clip includes an engagement head for attachment to the receiver element of the rack. The engagement head defines an outer surface. The retention clip also includes a curved tail that extends from the engagement head and contacts the sample collection unit when the sample collection unit is placed in the receptacle. The outer
(Continued)

surface of the retention clip does not project outwardly from the rack when the retention clip is attached to the rack.

16 Claims, 11 Drawing Sheets

(56) References Cited

U.S. PATENT DOCUMENTS

| | | | | |
|---|---|---|---|---|
| 5,651,941 A | * | 7/1997 | Stark | B01L 9/06 220/676 |
| 5,985,219 A | * | 11/1999 | Lind | B01L 9/06 422/562 |
| 6,156,275 A | | 12/2000 | Dumitrescu et al. | |
| 2006/0222573 A1 | | 10/2006 | Itoh | |
| 2009/0145866 A1 | | 6/2009 | Panosian et al. | |
| 2013/0209210 A1 | | 8/2013 | Nuotio | |

OTHER PUBLICATIONS

European Search Report and Search Opinion of European Application No. 18799382.9 dated Mar. 16, 2020.

* cited by examiner

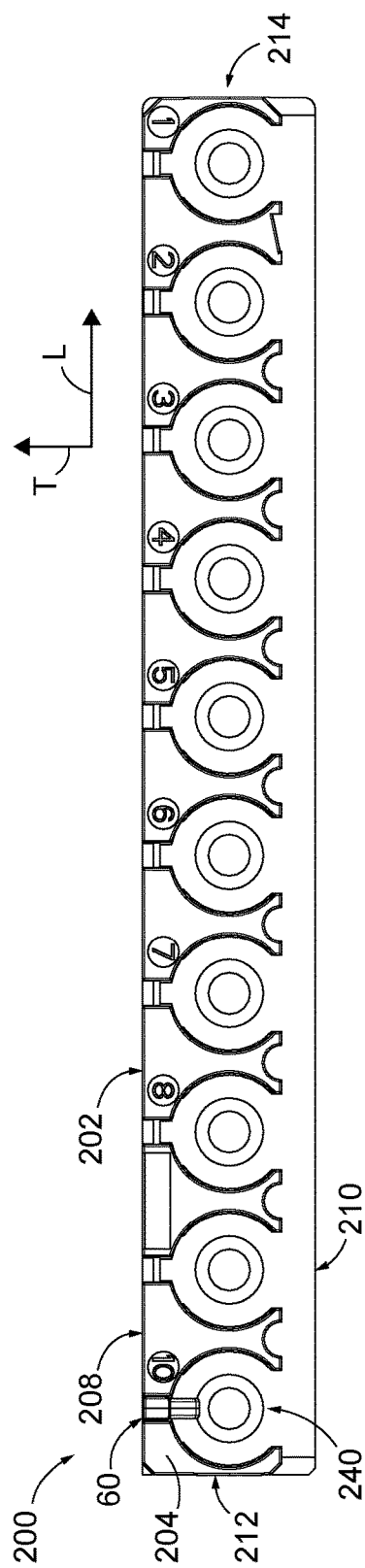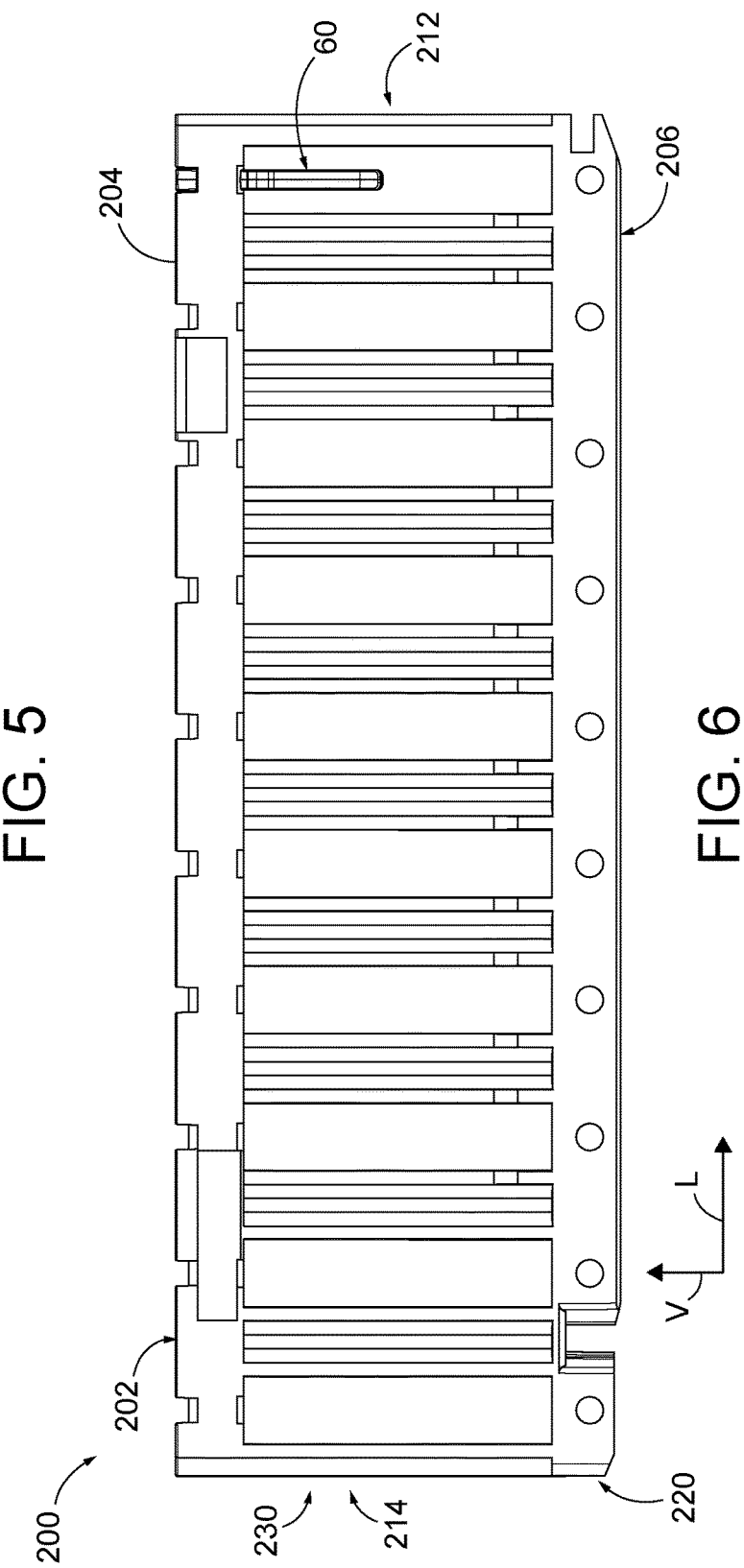
FIG. 5
FIG. 6

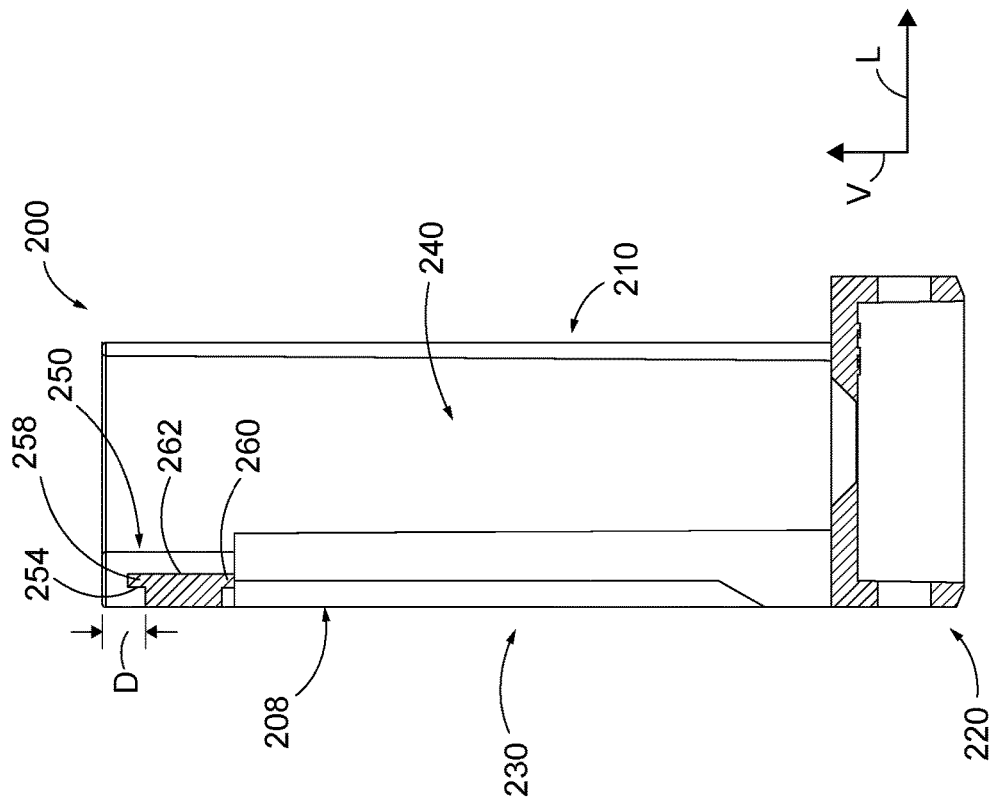
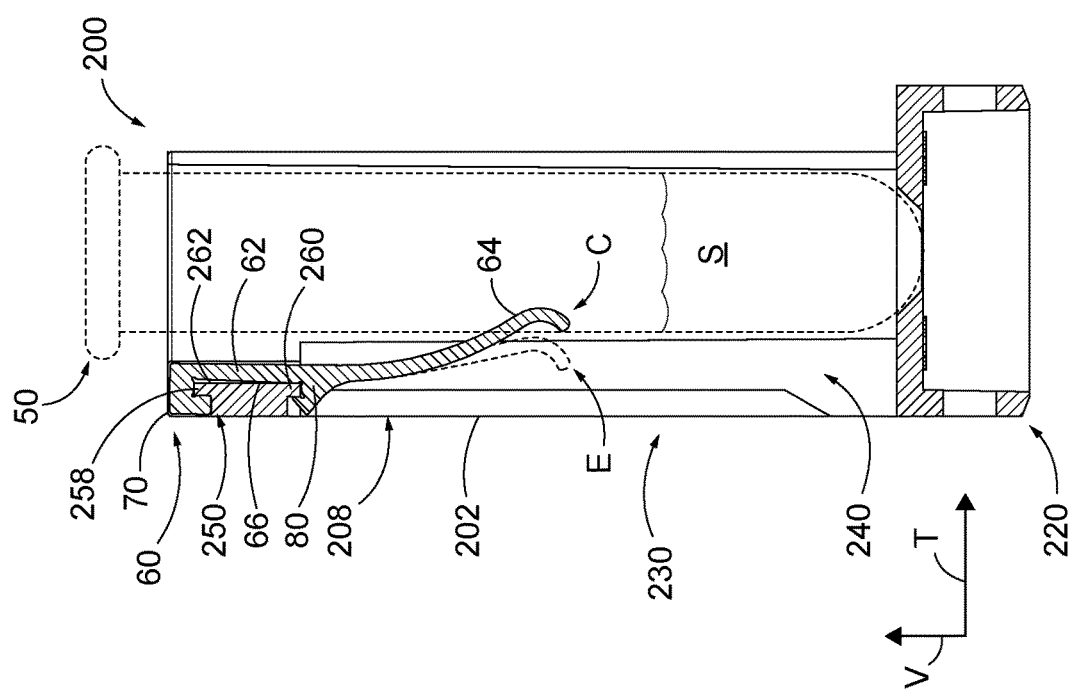

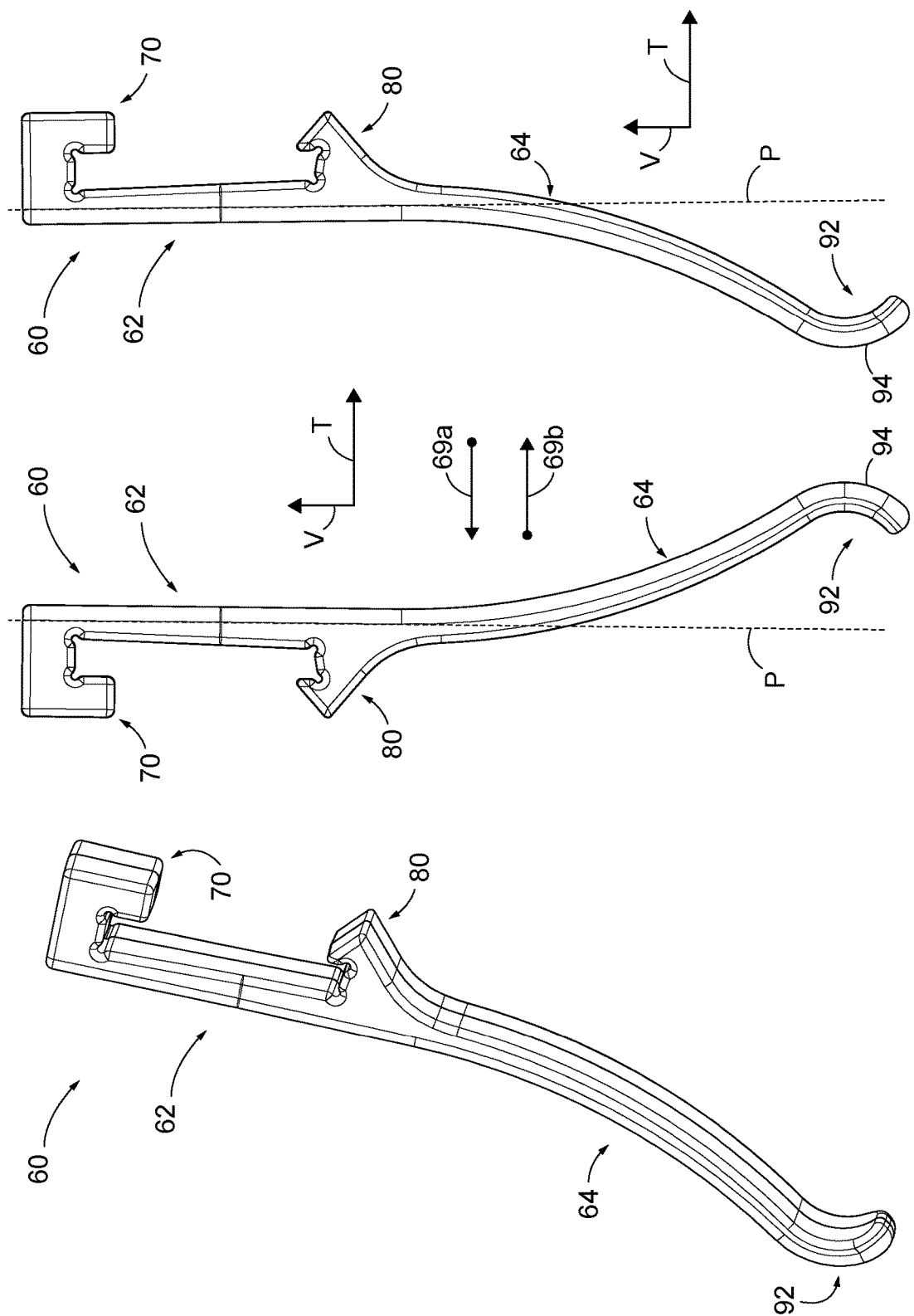

RETENTION CLIP AND SAMPLE RACK FOR A SAMPLE ANALYSIS SYSTEM

The subject application claims benefit under 35 USC § 119(e) of U.S. provisional Application No. 62/504,113, filed May 10, 2017. The entire contents of the above-referenced patent application are hereby expressly incorporated herein by reference.

TECHNICAL FIELD

The present disclosure relates to a retention clip and sample rack for a sample analysis system.

BACKGROUND

Diagnostic methods may include testing a sample to measure sample properties and/or to detect substances of interest that may be present in the sample. In the field of urinalysis, urine chemistry and sediments are commonly analyzed. The liquid sample usually contains one or more analytes/particles of interest. For urine chemistry analysis, the presence and concentrations of the analytes of interest in the sample are determinable by an analysis of the color changes undergone by the reagent pads that have been submerged in the liquid sample. For urine sediment analysis, the presence and concentrations of the particles of interest are measured by microscopic image analysis. These analyses may be done manually or using automated test device.

Samples are presented to the test device via a sample rack that holds multiple sample collection units, e.g. sample tubes. A conveyor may be used present the sample rack to a test region of the test device. When the sample rack is in the proper position, the test is carried out using analytical tools typical of such tests. In order to stabilize the sample collection units during this process, clips are used to hold the sample collection units in place in the sample rack. In conventional sample analysis systems, different clips are required for different types of sample collection units. For instance, a clip for a certain sized sample collection unit may not be suitable for another sized sample collection unit. Improper sized clips may result in sample collection units falling out of the sample rack during the test process of moving the sample racks described above. Keeping track of which clips to use for which specific sample tubes is also cumbersome, especially for so-called point-of-care applications.

SUMMARY

An embodiment of the present disclosure is a retention clip for attachment to a sample rack adapted to hold one or more sample collection units. The retention clip includes an engagement head for attachment to the sample rack. The engagement head may include a) a bridge that extends along a vertical direction, b) an upper engagement member extending from the bridge along a transverse direction that is perpendicular to the vertical direction, and c) a lower engagement member extending from the bridge along the transverse direction and spaced from the upper engagement member so as to face the upper engagement member. The upper engagement member and the lower engagement member attach the engagement head to the sample rack. The retention clip also includes a curved tail that extends from the engagement head.

Another embodiment of the present disclosure is a sample rack system. The sample rack system comprises a rack having a base, a top opposite the base along a vertical direction, a receptacle that extends from the top toward the base along the vertical direction, and a receiver element proximate the top. The receptacle is sized to receive a sample collection unit. The system also includes a retention clip for holding the sample collection unit in the receptacle. The retention clip includes an engagement head for attachment to the receiver element of the rack. The engagement head defines an outer surface. The retention clip also includes a curved tail that extends from the engagement head and contacts the sample collection unit when the sample collection unit is placed in the receptacle. The outer surface of the retention clip does not project outwardly from the rack when the retention clip is attached to the rack.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings:

FIG. 5 is a top plan view of the sample rack illustrated in FIG. 3;

FIG. 6 is a rear elevation view of the sample rack illustrated in FIG. 3;

FIG. 7 is a cross-sectional view of the sample rack taken along line A-A in FIG. 3;

FIG. 8 is a cross-sectional view of the sample rack taken along line B-B in FIG. 3;

FIG. 11 is a perspective view of a retention clip according to an embodiment of the present disclosure;

FIG. 12 is a right side elevation view of the retention clip shown in FIG. 11;

FIG. 13 is a left side elevation view of the retention clip shown in FIG. 11;

DETAILED DESCRIPTION OF ILLUSTRATIVE EMBODIMENTS

Figure 1:
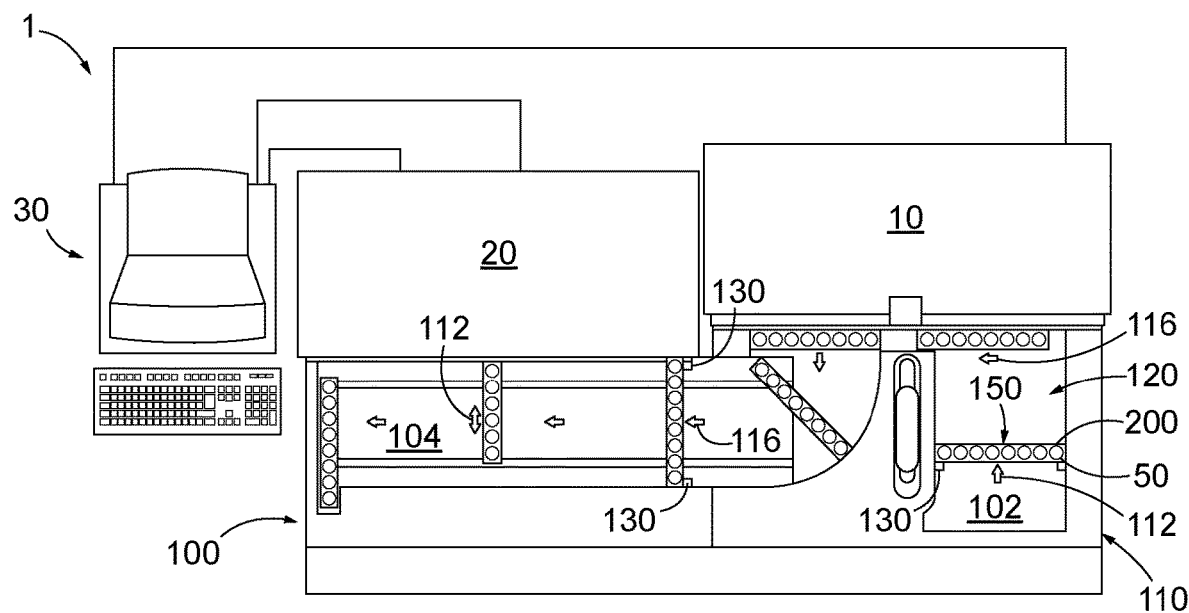
FIG. 1 is a schematic plan view of a sample analysis system according to an embodiment of the present disclosure.
Figure 2:
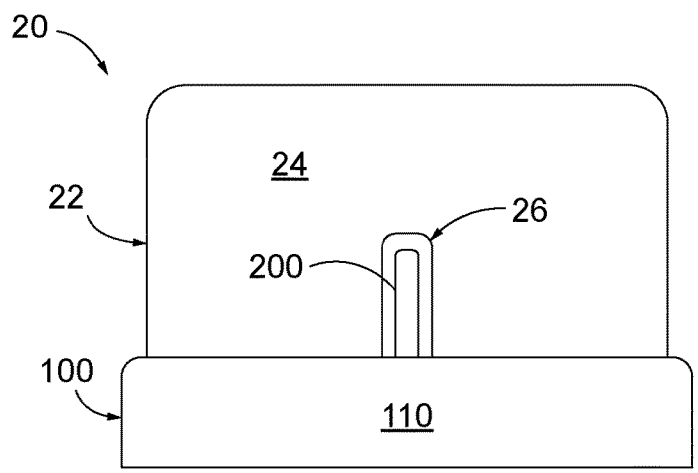
FIG. 2 is a front elevation view of a test device in the system shown in FIG. 1.
Figure 3:
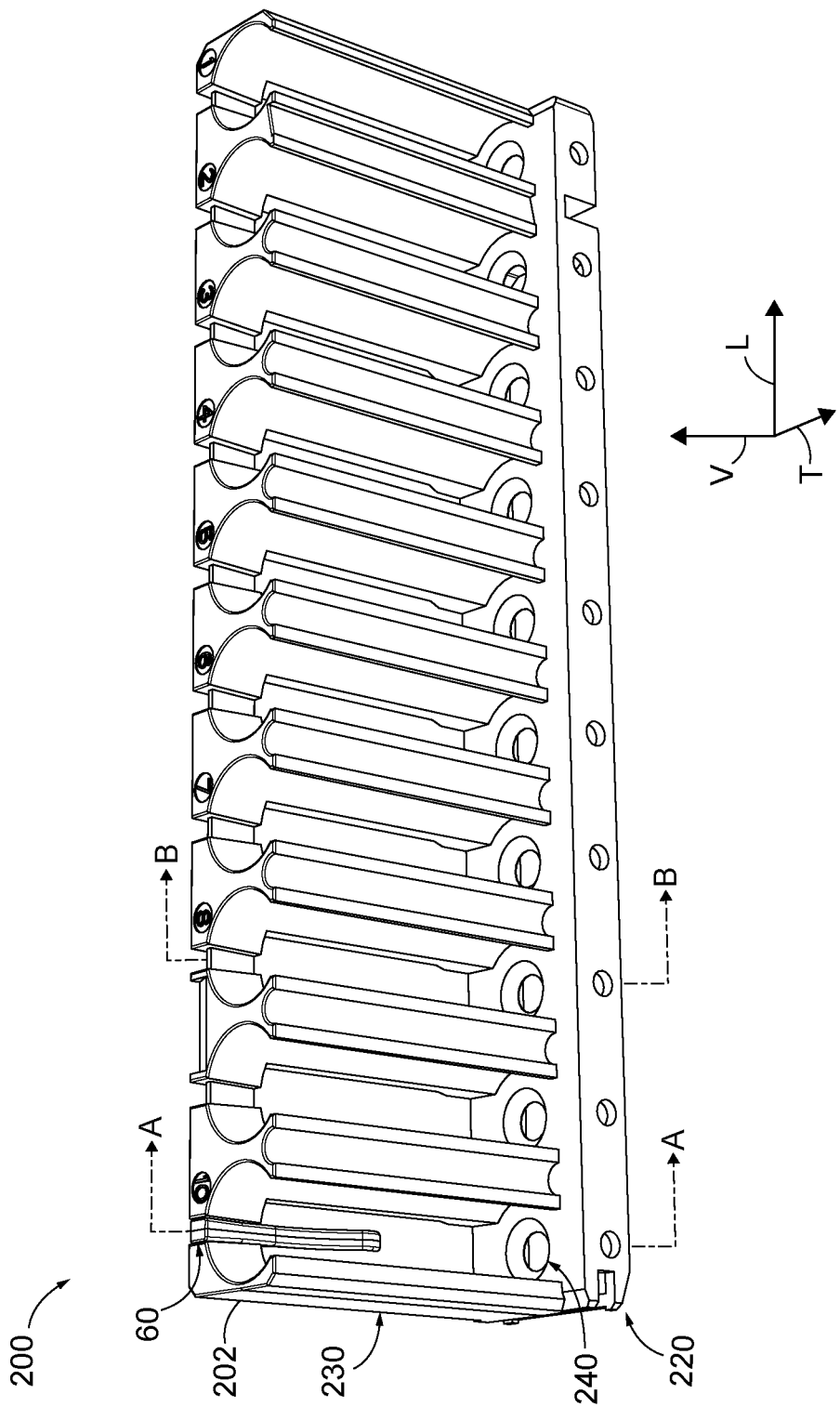
FIG. 3 is a top front perspective view of the sample rack used to hold samples tubes in the system illustrated in FIG. 1.

Referring to FIGS. 1-3, embodiments of the present disclosure include a sample analysis system 1 for analyzing samples. The sample analysis system 1 includes one or more test devices 10, 20, a computing device 30, a sample rack handler 100, a sample rack system 150. The sample rack system 150 may include one or more sample racks 200, sample collection units 50, and retention clips 60 (see FIG. 3) that hold the sample collection units 50 in place in the sample racks 200. Each sample collection unit 50 may contain a sample S for testing.

The computing device 30 may be used to control operation of the sample analysis system 1. The computing device 30 may include typical components of a computer, including a memory, one or more processors, a user interface, input/output ports, and various software applications used to run the sample analysis system 1. The computing device 30 may be a separate component as illustrated. Alternatively, the computing device 30 may integrated with either or both test devices.

As discussed above, the sample analysis system 1 may include at least one test device, e.g. a first test device 10 and a second device 20. The first and second test devices 10 and 20 are designed to analyze analytes of interest in the sample S contained in the sample collection units 50. In the illustrated embodiment, the first test device 10 is configured to analyze the sample contained in the sample collection unit 50. For example, the test device 10 may include spectrophotometer that determines the color of the sample applied to one or more of the reagent pads on a test strip by illuminating the reagent pad and taking a number of reflectance readings. Each reflectance reading has a magnitude relating to a different wavelength of visible light. Test devices 10 (or 20) may employ a variety of area array detection read-heads utilizing CCD (charge-coupled device), CID (charge-injection device) or PMOS detection structures for detecting color changes to the reagent pads. The color changes can be used to determine the presence of analytes of interest. While a spectrophotometer is described above, other systems for testing a sample may be used in the sample analysis system and the present disclosure is not strictly limited to optical based systems.

Multiple test devices 10 and 20 may be used for robust evaluations of samples. If the data obtained by the first test device 10 indicates a need for further analysis, the sample rack 200 and sample collection units 50 are conveyed to the second test device 20 and further tests are performed on the samples by the second test device 20. However, it should be appreciated that the inventive concepts as described herein are not strictly limited to analysis systems that include two or more separate test devices as described above.

Figure 4:
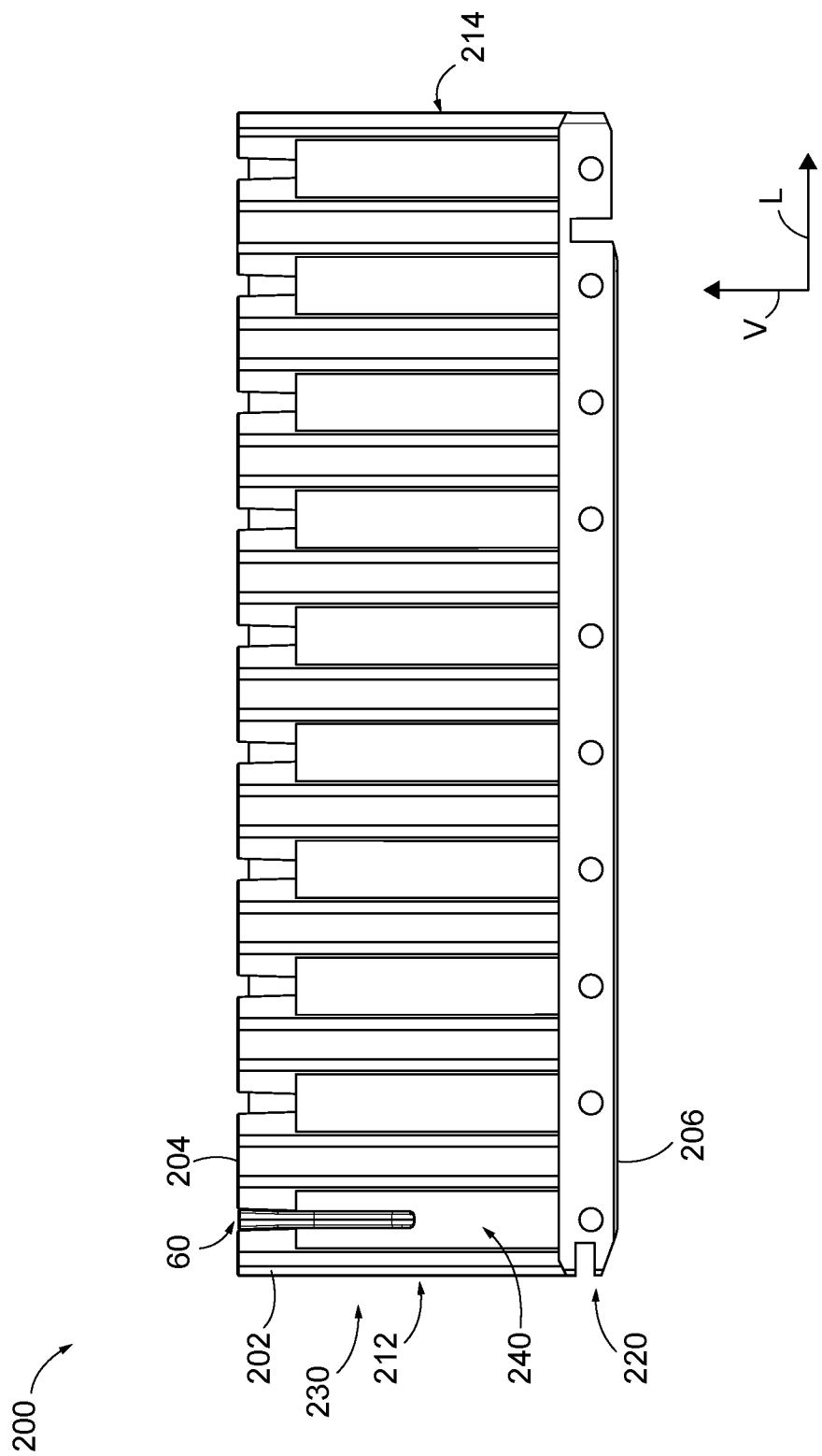
FIG. 4 is a front elevation view of the sample rack illustrated in FIG. 3.
Figure 9:
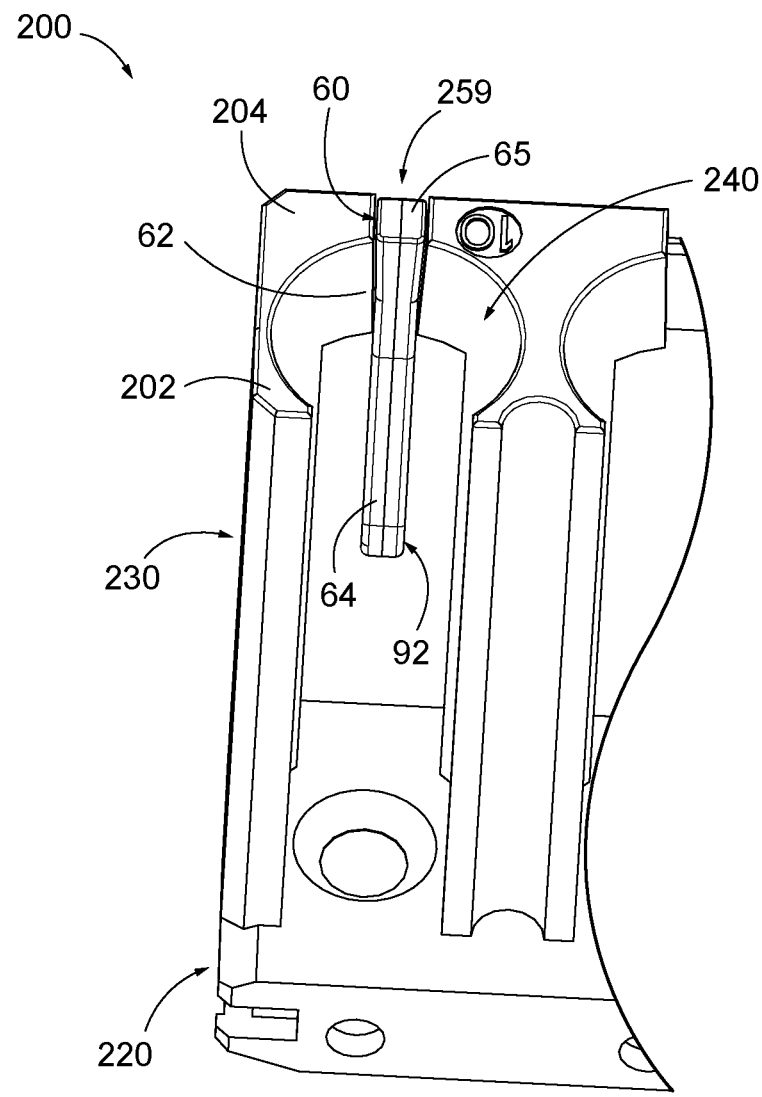
FIG. 9 is a detailed top perspective view of a retention clip attached to the sample rack.

As best shown in FIGS. 1 and 2, the second test device 20 includes a housing 22, analyzer (not shown) contained in the housing 22. The housing 22 is coupled to the rack handler 100 and includes front panel 24 near where the rack handler 100 is coupled to the second test device 20. The front panel 24 includes a portal 26 through which the sample rack 200 travels if it is determined that a sample in the sample rack 200 needs further analysis. The portal 26 is sized so that the sample rack 200 enters therethrough along a direction aligned with a length L (FIG. 4) of the sample rack 200. In prior art systems, the retention clips would project above the top and/or the sides of the sample rack 200. As the sample rack 200 enters the portal 26 the retention clips on the sample rack 200 could catch the front panel 24, sometimes dislodging one or more sample collection units 50. In accordance with embodiments of the present disclosure, the retention clip 60 has a low-profile design such that it sits at or below the top surface of sample rack 200. In this manner, the retention clip 60 avoids catching the front panel 24 of the test device 20 when moving through the portal 26.

Referring to back to FIGS. 1 and 2, the sample rack handler 100 includes a base 110, a conveyer element 120 supported by the base 110, and guide elements 130 that work with the conveyer element 120 to guide sample racks 200 through the rack handler 100. The sample rack handler 100 includes an input staging area 102 where sample racks 200 to be tested can be staged in the input staging area 102, and an output staging area 104 where sample racks 200 are collected once testing is complete. The conveyer element 120 is designed to hold, and convey, multiple sample racks 200 from the input staging area 102 to the first test device 10, from the first test device 10 to the second test device 20, and further into output staging area 104.

As illustrated, the conveyer element 120 and guide elements 130 advance the sample rack 200 to the first test device in a first direction 112. The rack handler 100 then moves the sample rack 200 in a lateral direction 114 into a testing position proximate an analyzer in the test device 10. The rack handler 100 can then pivot the sample rack 200 so that sample rack 200 is positioned to travel in a second direction 116 that is perpendicular to first direction 112. The conveyer element 120 translates the sample rack 200 in the second direction. Once the sample rack 200 is positioned adjacent to portal 26, guide elements (not shown) pull the sample rack 200 along the first direction 112 into the housing 22 of the second test device 20 so that the sample(s) can be further analyzed. As discussed further below, the low profile retention clip 60 avoids catching the housing 22 as the sample rack 200 is moved into the housing 22 of the second test device 20. The rack handler 100 as illustrated includes a serpentine travel path for the conveyor element. It should be appreciated that the inventive concepts disclosed herein are not limited to the specific conveyor path shown. For instance, the conveyer element 130 may have U shaped path in front of the test device 10. Furthermore, the first and second test devices 10 and 20 may be separate devices that are linked by a common conveyer element 130 as illustrated in the drawings. Accordingly, the sample rack system 150 as disclosed herein, which may include rack 200 and/or retention clip 60, may be used with any type of sample analysis system that includes sample racks.

Referring to FIGS. 3-6, each sample rack 200 includes a rack body 202 defining a top surface 204, a bottom surface 206 opposite the top surface 204 along a vertical direction V, a first side 208, a second side 210 opposite the first side 208 along a transverse direction T that is perpendicular to the vertical direction V. The rack body 202 includes a first end 212, and a second end 214 opposite the first end 212 along a longitudinal direction L that is perpendicular to the vertical direction V and the transverse direction V. As illustrated, the rack body 202 further includes a base portion 220 that defines the bottom surface 206, and a rack portion 230 that extends upwardly from the base portion 220 along the vertical direction V. The rack portion 230 defines the top surface 204. The rack body 202 further defines at least one receptacle 240 (such as a plurality of receptacles). The receptacle 240 is sized and shaped to hold a sample collection unit 50. In accordance with the illustrated embodiment, the rack 200 includes 10 separate receptacles 240. However, the rack 200 may include less than ten receptacles, such as one receptacle 240, or more than ten receptacles 240.

Referring to FIGS. 7-10B, the upper portion of the rack 200 includes a receiver element 250 for coupling to the retention clip 60. The receiver element 250 includes recessed surface 254 that extends into from the top surface 204 to create channel 259 wide enough to hold the engagement head 62 of a retention clip 60. The surface 254 extends into the rack body 202 a distance D that is sufficient to allow the retention clip 60 to rest within the receiver element 250 so that no portion of the engagement head 62 extends above the top surface 204 of the rack 200. The rack body 202 includes a lateral surface 256, a first tab 258, a second tab 260, and a bridging surface 262. The first and second grooves 258 and 260 are designed to engage first and second protrusions 74 and 84 (FIG. 18) of the retention clip 60 such that the contact surface 68 (FIG. 18) of the retention clip 60 faces the bridge surface 262 of the rack body 202 when the retention clip 60 is coupled to receiver element 250.

Figure 18:
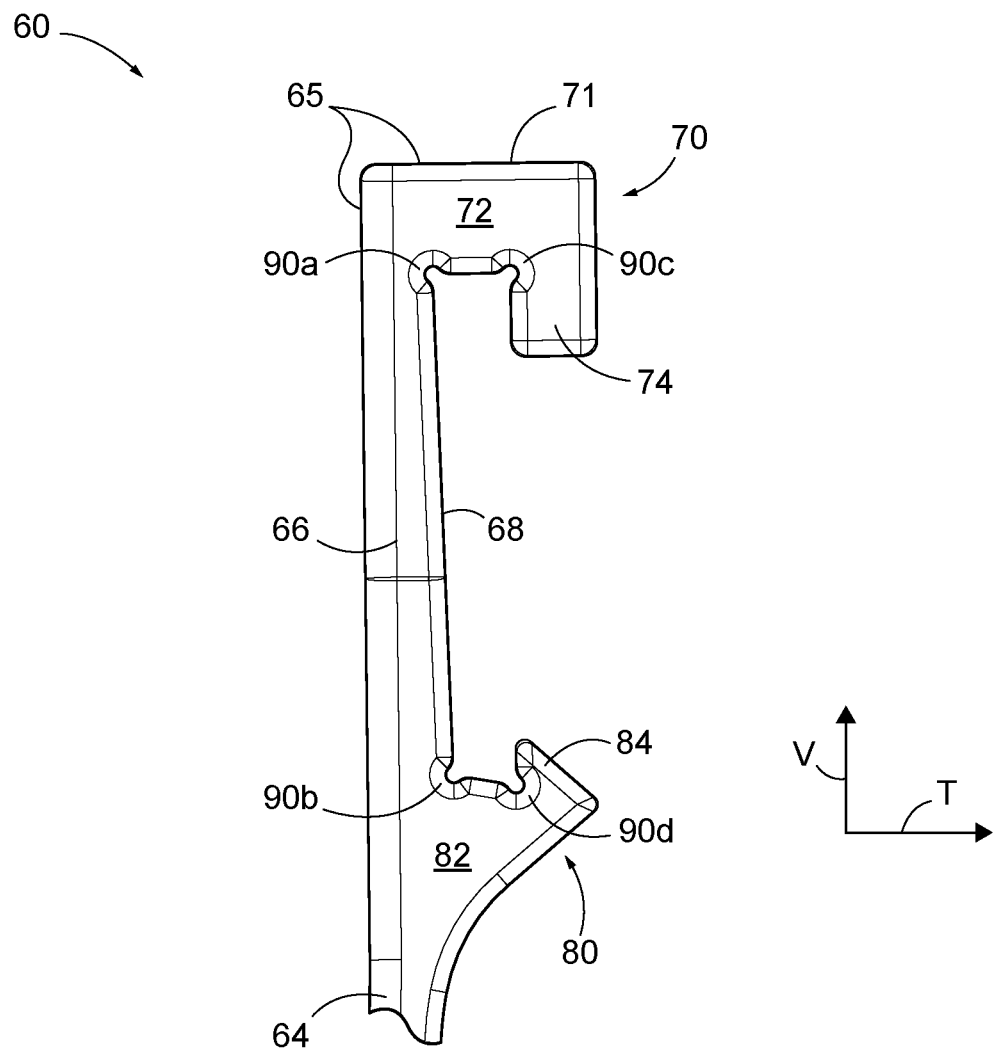
FIG. 18 is a detailed side view of a portion of the retention clip illustrated in FIG. 11.

FIGS. 11-18 illustrate a retention clip 60 according to an embodiment of the present disclosure. The retention clip 60 includes an engagement head 62 for attachment to the sample rack 200 and a curved tail 64 that extends from the engagement head 62. As shown in FIG. 18, the engagement head 62 includes a bridge 66 that extends along a vertical direction V and has a generally linear profile. The curved tail 64 extends downwardly from a lower end of the bridge 66. The engagement head 62 further includes an upper engagement member 70 and a lower engagement member 80 that is spaced apart from the upper engagement member 70. The upper engagement member 70 and the lower engagement member 80 are adapted to attach the engagement head 62 to the sample rack 200. The engagement head 62 includes an outer surface 65. The bridge 66 includes a contact surface 68 that extends from the upper engagement member 70 to the lower engagement member 80

The upper engagement member 70 extends from the bridge 66 along a transverse direction T that is perpendicular to the vertical direction V. As illustrated, the upper engagement member 70 includes a first flange 72 and a first protrusion 74 that extends from the first flange 72 along the vertical direction V toward the lower engagement member 80. The protrusion 74 defines an engagement surface 76 that may face, and in some instances is substantially parallel to, the contact surface 68 of the bridge 66. The upper engagement member 70 further defines an upper-most surface 71. In accordance with at least one embodiment, no other portion of the retention clip 60 extends above the upper-most surface 71 along the vertical direction V.

The lower engagement member 80 extends from the bridge 66 along the transverse direction T and is also spaced from the upper engagement member 70. In this manner, the lower engagement member 80 can at least partially face the upper engagement member 70. The lower engagement member 80 includes a second flange 82 and a second protrusion 84 that extends from the second flange 82 along the vertical direction V toward the upper engagement member 70. The second protrusion 84 defines an engagement surface 86 that may face, and in some instances is substantially parallel to, the contact surface 68 of the bridge 66. The lower engagement member may optionally include an inclined surface 88 that extends between the second flange and an upper end of the curved tail 64. The inclined surface 88 is angularly offset with respect to the contact surface 68 of the bridge 66.

Referring to FIG. 18, the engagement head 62 may optionally include a plurality of notches. As illustrated, the engagement head 62 includes a first notch 90a where the upper engagement member 70 and the bridge 66 intersect, and a second notch 90b where the lower engagement member 80 and bridge 66 intersect. A third notch 90c is located at the corner of the first flange 72 and first protrusion 74 and a fourth notch 90d may be located at the corner of the second flange 82 and second protrusion 84. Each of the notches 90a-90d may be configured to minimize stress concentrations in the engagement head 62 where various surfaces intersect at relatively sharp angles (such as about 90 degrees or less). The notches 90a-90d may help improve durability of the retention clips 60 when subjected to stresses that accompany attaching and detaching the engagement head 62 to and from the receiver element 250 of the sample rack 20, respectively. For instance, during repeated attachment to the receiver element 250 of the sample rack 200, the bridge 66, the upper engagement member 70, and the lower engagement member 80 flex in order to attach to the recess surfaces 254 and grooves 258, 260 of the receiver element 250. Repeated use, and thus repeated flexing, may induce cracks at sharp corners. The notches may be used to reduce stress concentrations at sharp corners during repeated flexing described above.

Figure 10A:
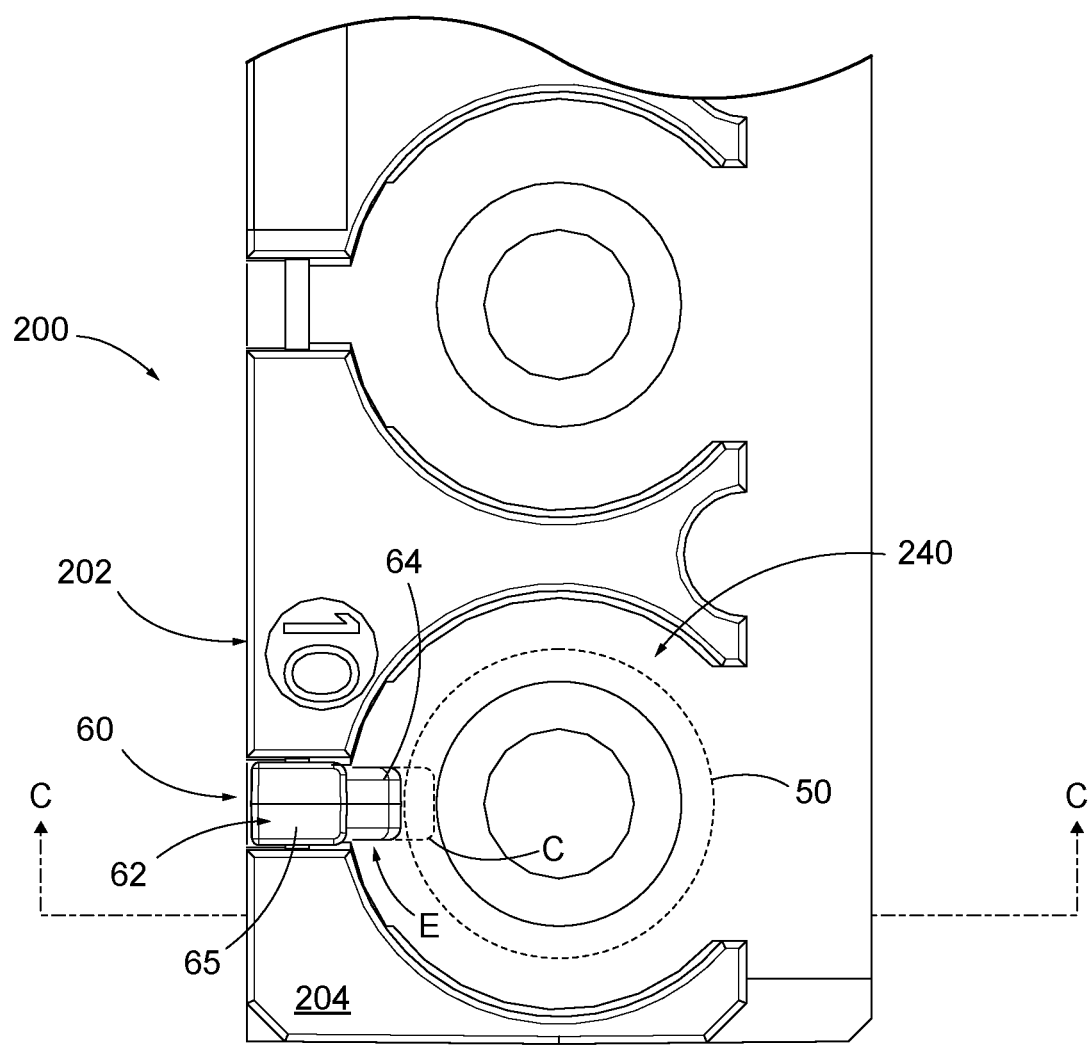
FIG. 10A is a detailed top perspective view of a retention clip attached to the sample rack and holding a sample collection unit in place.
Figure 10B:
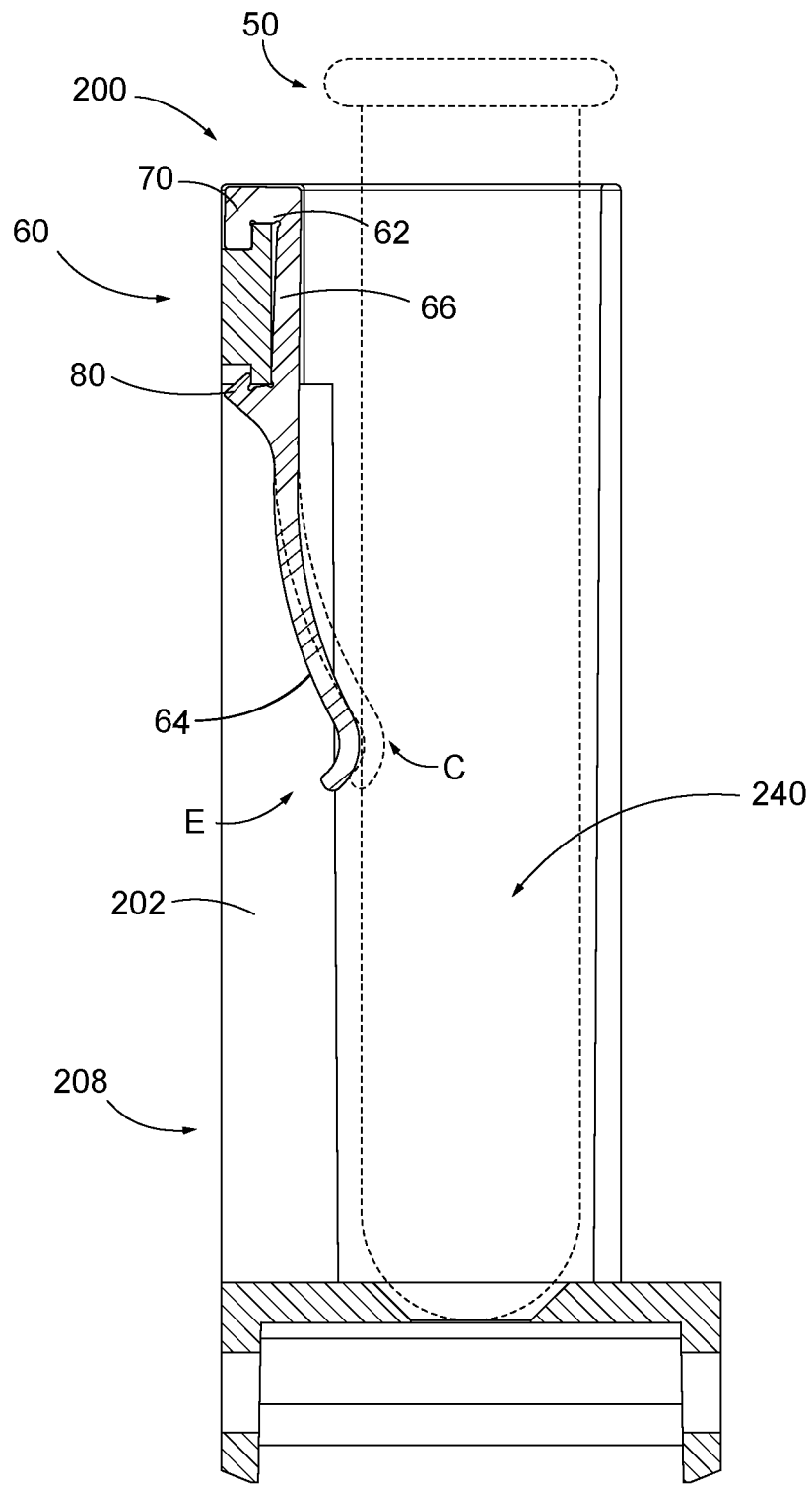
FIG. 10B is a side partial sectional view of a retention clip attached to the sample rack and holding a sample collection unit in place, take along line C-C in FIG. 10A.
Figure 17:
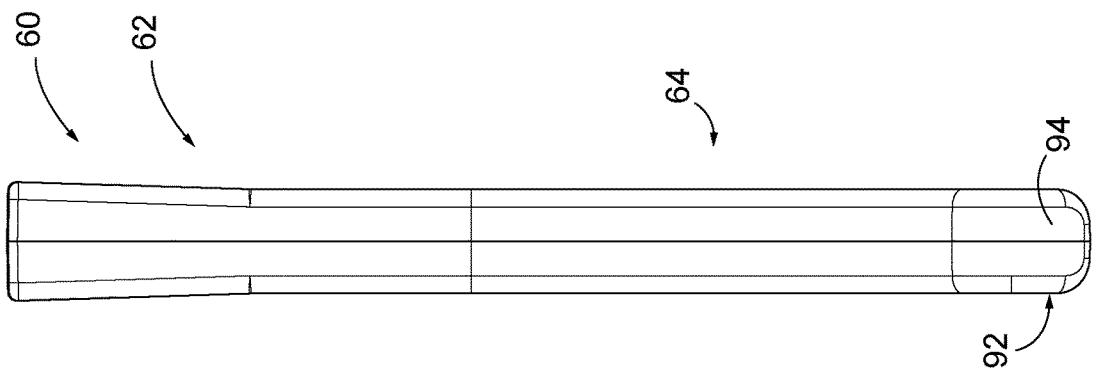
FIG. 17 is a rear elevation view of the retention clip shown in FIG. 11.
Figure 16:
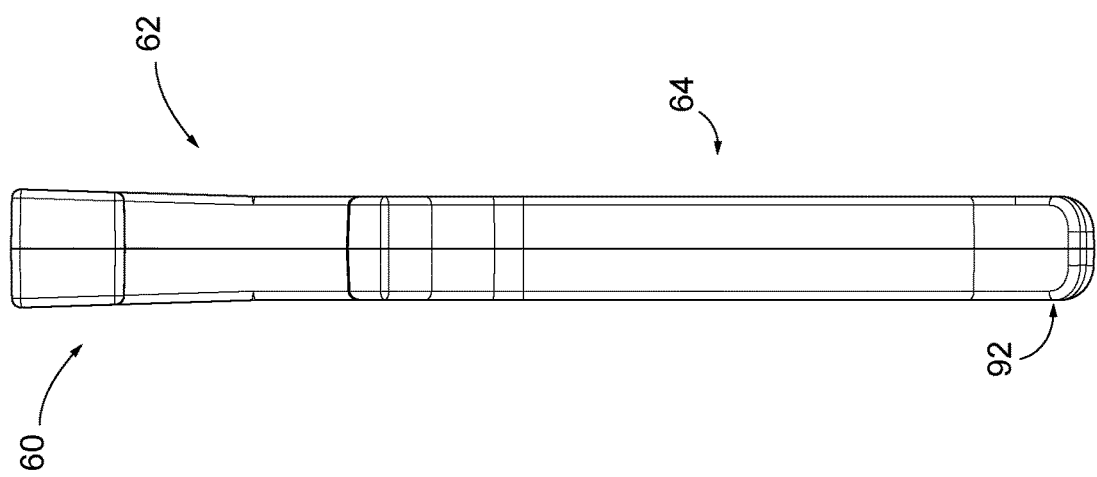
FIG. 16 is a front elevation view of the retention clip shown in FIG. 11.
Figure 14:
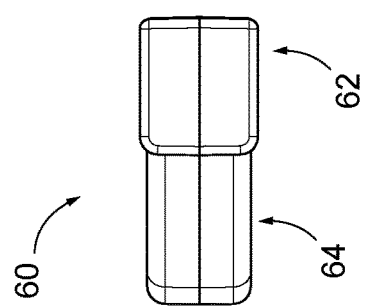
FIG. 14 is a top plan view of the retention clip shown in FIG. 11.
Figure 15:
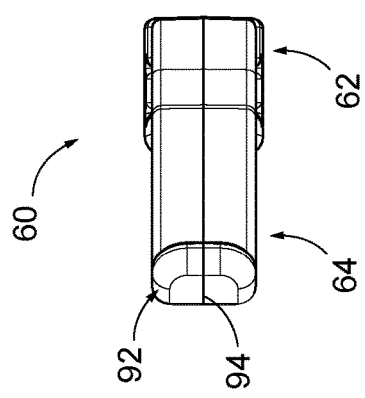
FIG. 15 is a bottom plan view of the retention clip shown in FIG. 11.

The curved tail 64 is curved in a direction 69a opposite to a direction 69b that the upper engagement member 70 and the lower engagement member 80 extend. As shown, the curved tail 64 curves as it extends from a lower engagement member 80 to its terminal end 92. The tail terminal end 92 includes a curved contact surface 94 for contact with the sample collection unit 50, as best shown in FIGS. 10A and 10B. The terminal end 92 is offset with respect to plane P that extends through the bridge 66 along the vertical direction V.

Referring back to FIGS. 10A and 10B, the curved tail 64 is designed to flex in response to sample collection unit 50 being inserted into the receptacle 240 of the sample rack 200. More specifically, application of a force by inserting the sample collection unit 50 into the receptacle 240 causes to the curved tail 64 to deflect from a curved configuration C (shown in dashed lines in FIGS. 10A and 10B) into a linear configuration E (as best shown in solid lines in FIGS. 10A and 10B). In the linear configuration, the curved tail 64 is straightened so that the tail 64 substantially parallel to vertical axis 2 that is aligned with the vertical direction V. In this regard, the curved tail 64 is deflectable within a footprint of the sample rack 200 defined by the base and sides of the sample rack. However, the flexural rigidity of the curved tail 64 is designed to maintain contact with sample collection unit 50 during insertion into the receptacle and through subsequent use in the analysis system 1.

The retention clip 60 has several advantageous features. The retention clip 60 as illustrated is suitable for holding in place a wide range of sample collection units and types. For instance, the retention clip 60 is suitable for use with typical sample collection units that have a semi-spherical bottom. In such a case, when the sample collection unit is inserted into the receptacle, the spherical bottom rides along the curved tail 64 and also causes the curved tail to deflect until the terminal end begins to ride along the sides of the sample collection tube. This interaction improves smoothness of inserting (or removing) sample collection units. For sample collection units that have so-called skirted bottoms, the skirted bottom, which is typically flat, does not get caught on any structure protruding from the curved tail. Again, in this case, the skirted bottom of the sample collection unit abuts and then rides along the curved tail 64. Once the terminal end clears the curved bottom, the risk of sample collection unit catching in the receptacle before full insertion is complete is minimized.

Furthermore, the retention clip 60 has a low profile engagement head 62 that is designed to fit within a recessed region of a sample rack 200. In this case, the low-profile engagement head does not project outwardly with respect to the sample rack. This, in turn, minimizes instances where the sample rack catches on the structure of the test device when the sample rack is moving into the testing region of those devices.

The invention as described in the present disclosure includes the following list of exemplary embodiments.

Embodiment 1 is directed to a retention clip for attachment to a sample rack adapted to hold one or more sample collection units. In the retention clip includes an engagement head for attachment to Embodiment # is the sample rack and a curved tail that extends from to the engagement head. The engagement head includes a bridge that extends along a vertical direction and an upper engagement member extending from the bridge along a transverse direction that is perpendicular to the vertical direction. The engagement head also includes a lower engagement member extending from the bridge along the transverse direction and spaced from the upper engagement member so as to face the upper engagement member, wherein the upper engagement member and the lower engagement member attach the engagement head to the sample rack.

Embodiment 2 is the retention clip of embodiment 1, wherein the bridge includes a contact surface that extends from the upper engagement member to the lower engagement member, wherein a portion of the first engagement member and a portion of the lower engagement member are substantially parallel to the contact surface.

Embodiment 3 is the retention clip of embodiment 1, wherein the upper engagement member includes a first flange and a first protrusion that extends from the first flange along the vertical direction toward the lower engagement member.

Embodiment 4 is the retention clip of embodiment 3, wherein the lower engagement member includes a second flange and a second protrusion that extends from the second flange along the vertical direction toward the upper engagement member.

Embodiment 5 is the retention clip of embodiment 4, wherein the lower engagement member includes an inclined surface that extends between the second flange and the second protrusion, wherein the inclined surface is angularly offset with respect to the contact surface.

Embodiment 6 is the retention clip of embodiment 1, wherein the upper engagement member defines an upper-most surface, wherein no other portion of the retention clip extends above the upper-most surface along the vertical direction.

Embodiment 7 is the retention clip of embodiment 1, wherein the curved tail is curved in a direction away from the upper and lower engagement members.

Embodiment 8 is the retention clip of embodiment 1, the curved tail defines a terminal end that includes a curved contact surface, wherein and entirety of the terminal end is offset with respect to a vertical plane that extends through the bridge along the vertical direction.

Embodiment 9 is the retention clip of embodiment 1, wherein application of a force to the curved tail deflects the curved tail from a curved configuration into a straightened configuration where the curved tail is substantially aligned with vertical direction.

Embodiment 10 is directed to a sample rack system having a rack. The tack has a base, a top opposite the base along a vertical direction, a receptacle that extends from the top toward the base along the vertical direction, and a receiver element proximate the top. The receptacle is sized to receive a sample collection unit. The system of embodiment 10 also includes a retention clip for holding the sample collection unit in the receptacle. The retention clip has a) an engagement head for attachment to the receiver element of the rack with the engagement head defining an outer surface, and b) a curved tail that extends from the engagement head and contacts the sample collection unit when the sample collection unit is placed in the receptacle. The outer surface of the retention clip does not project outwardly from the rack when In the retention clip is attached to the rack.

Embodiment 11 is the sample rack system of embodiment 10, wherein the engagement head comprises: a) a bridge that extends along a vertical direction; b) an upper engagement member extending from the bridge along a transverse direction that is perpendicular to the vertical direction; and c) a lower engagement member extending from the bridge along the transverse direction and spaced from the upper engagement member so as to face the upper engagement member. The upper engagement member and the lower engagement member attach the engagement head to the receiver element of Embodiment # is the sample rack.

Embodiment 12 is the sample rack system of embodiment 11, wherein the bridge includes a contact surface that extends from the upper engagement member to the lower engagement member, wherein a portion of the first engagement member and a portion of the lower engagement member are substantially parallel to the contact surface.

Embodiment 13 is the sample rack system of embodiment 11, wherein the upper engagement member includes a first flange and a first protrusion that extends from the first flange along the vertical direction toward the lower engagement member.

Embodiment 14 is the sample rack system of embodiment 13, wherein the lower engagement member includes a second flange and a second protrusion that extends from the second flange along the vertical direction toward the upper engagement member.

Embodiment 15 is the sample rack system of embodiment 14, wherein the lower engagement member includes an inclined surface that extends between the second flange and the second protrusion, wherein the inclined surface is angularly offset with respect to the contact surface.

Embodiment 16 is the sample rack system of embodiment 11, wherein the upper engagement member defines an upper-most surface, wherein no other portion of In the retention clip extends above the upper-most surface along the vertical direction.

Embodiment 17 is the sample rack system of embodiment 10, wherein application of a force to the curved tail deflects the curved tail from a curved configuration into a straightened configuration where the curved tail is substantially aligned with vertical direction.

Embodiment 18 is the sample rack system of embodiment 10, wherein at least a portion of the receiver element is recessed into the top of the rack such that no portion of the outer surface of In the retention clip extends outwardly from the rack when the engagement head is attached to the receiver element.

Embodiment 19 is the sample rack system of embodiment 10, wherein the curved tail is curved in a direction away from the upper and lower engagement members.

Embodiment 20 is the sample rack system of embodiment 10, wherein the curved tail defines a terminal end that includes a curved contact surface, wherein and entirety of the terminal end is offset with respect to a vertical plane that extends through the engagement head along the vertical direction.

Embodiment 21 is the sample rack system of embodiment 10, wherein the curved contact surface contacts the sample collection unit.

Embodiment 22 is the sample rack system of embodiment 10, wherein application of a force to the curved tail deflects the curved tail from a curved configuration into a straightened configuration where the curved tail is substantially aligned with vertical direction.

Embodiment 23 is the sample rack system of embodiment 10, wherein the curved tail is deflectable within a footprint of the sample rack defined by the base.

Embodiment 24 is a sample analysis system. The sample analysis system of embodiment 24 includes at least one test device, a sample rack handler; and the sample rack system according to any one of embodiments 10 through 23.

The invention as described in the present disclosure is capable of exploitation in industry in accordance with how it can be made and/or used.

Those skilled in the art will also appreciate that the present disclosure may be applied to other applications and may be modified without departing from the scope of the present disclosure. Accordingly, the scope of the present disclosure is not intended to be limited to the exemplary embodiments described above, but only by the appended claims.

The invention claimed is:

1. A retention clip for attachment to a sample rack adapted to hold one or more sample collection units, the retention clip comprising:
   an engagement head for attachment to the sample rack, the engagement head having:
      a) a bridge that extends along a vertical direction,
      b) an upper engagement member extending from the bridge along a transverse direction that is perpendicular to the vertical direction, and
      c) a lower engagement member extending from the bridge along the transverse direction and spaced from the upper engagement member so as to face the upper engagement member, wherein the upper engagement member and the lower engagement member attach the engagement head to the sample rack; and
   no more than one curved tail that extends from a lower end of the bridge of the engagement head, the curved tail having a free terminal end wherein application of a force to the free terminal end deflects the free terminal end relative to the engagement head.

2. The retention clip of claim 1, wherein the bridge includes a contact surface that extends from the upper engagement member to the lower engagement member, wherein a portion of the upper engagement member and a portion of the lower engagement member are substantially parallel to the contact surface.

3. The retention clip of claim 2, wherein the upper engagement member includes a first flange and a first protrusion that extends from the first flange along the vertical direction toward the lower engagement member.

4. The retention clip of claim 3, wherein the lower engagement member includes a second flange and a second protrusion that extends from the second flange along the vertical direction toward the upper engagement member.

5. The retention clip of claim 4, wherein the lower engagement member includes an inclined surface that extends between the second flange and the second protrusion, wherein the inclined surface is angularly offset with respect to the contact surface.

6. The retention clip of claim 1, wherein the upper engagement member defines an upper-most surface, wherein no other portion of the retention clip extends above the upper-most surface along the vertical direction.

7. The retention clip of claim 1, wherein the curved tail is curved in a direction away from the upper and lower engagement members.

8. The retention clip of claim 1, wherein the curved tail includes a curved contact surface, wherein an entirety of the free terminal end is offset with respect to a vertical plane that extends through the bridge along the vertical direction.

9. The retention clip of claim 1, wherein application of a force to the curved tail deflects the curved tail from a curved configuration into a straightened configuration where the curved tail is substantially aligned with the vertical direction.

10. A sample rack system, comprising
    a rack having a base, a top opposite the base along a vertical direction, a receptacle that extends from the top toward the base along the vertical direction, and a receiver element proximate the top, wherein the receptacle is sized to receive a sample collection unit, and
    a retention clip for holding the sample collection unit in the receptacle, the retention clip having:
       a) an engagement head attached to the receiver element of the rack, the engagement head defining an outer surface, the engagement head comprising:
          a bridge that extends along a vertical direction;
          an upper engagement member extending from the bridge along a transverse direction that is perpendicular to the vertical direction; and
          a lower engagement member extending from the bridge along the transverse direction and spaced from the upper engagement member so as to face the upper engagement member,
          wherein the upper engagement member and the lower engagement member attach the engagement head to the receiver element of the sample rack, and
       b) no more than one curved tail that extends from a lower end of the engagement head and contacts the sample collection unit when the sample collection unit is placed in the receptacle, the curved tail having a free terminal end wherein application of a force to the free terminal end deflects the free terminal end relative to the engagement head,
    wherein the outer surface of the retention clip does not project outwardly from the rack.

11. The sample rack system of claim 10, wherein the bridge includes a contact surface that extends from the upper engagement member to the lower engagement member, wherein a portion of the upper engagement member and a portion of the lower engagement member are substantially parallel to the contact surface.

12. The sample rack system of claim 10, wherein the upper engagement member includes a first flange and a first protrusion that extends from the first flange along the vertical direction toward the lower engagement member.

13. The sample rack system of claim 12, wherein the lower engagement member includes a second flange and a second protrusion that extends from the second flange along the vertical direction toward the upper engagement member.

14. The sample rack system of claim 10, wherein the curved tail includes a curved contact surface, wherein an entirety of the free terminal end is offset with respect to a vertical plane that extends through the engagement head along the vertical direction.

15. The sample rack system of claim 14, further comprising a sample collection unit positioned in the receptacle, and wherein the curved contact surface is in contact with the sample collection unit.

16. The sample rack system of claim 10, wherein application of a force to the curved tail deflects the curved tail from a curved configuration into a straightened configuration where the curved tail is substantially aligned with the vertical direction.

* * * * *